United States Patent [19]

Arzoumanidis et al.

[11] 4,400,494

[45] Aug. 23, 1983

[54] OLEFIN POLYMERIZATION CATALYST

[75] Inventors: Gregory G. Arzoumanidis; Benjamin S. Tovrog, both of Naperville, Ill.

[73] Assignee: Standard Oil Company (Indiana), Chicago, Ill.

[21] Appl. No.: 297,272

[22] Filed: Aug. 28, 1981

[51] Int. Cl.$^3$ .......................... C08F 2/34; C08F 10/06
[52] U.S. Cl. .................................. 526/119; 252/429 B; 526/140; 526/142; 526/153; 526/159; 526/904
[58] Field of Search .................... 252/429 B; 526/119, 526/140, 142, 153, 159

[56] References Cited

U.S. PATENT DOCUMENTS

| | | | |
|---|---|---|---|
| 3,960,765 | 6/1976 | Shiga et al. | 526/142 |
| 4,258,161 | 3/1981 | Kakogawa et al. | 526/142 |
| 4,295,991 | 10/1981 | Wristers | 526/142 |
| 4,324,693 | 4/1982 | Arzoumanidis et al. | 526/142 |

FOREIGN PATENT DOCUMENTS

| | | |
|---|---|---|
| 2474039 | 7/1981 | France . |
| 1548573 | 7/1979 | United Kingdom . |
| 2070035 | 9/1981 | United Kingdom . |

*Primary Examiner*—Edward J. Smith
*Attorney, Agent, or Firm*—Wallace L. Oliver; William T. McClain; William H. Magidson

[57] ABSTRACT

A propylene polymerization catalyst comprises (a) a titanium-containing component formed by reducing titanium tetrachloride with an aluminum alkyl, optionally contacting the resulting reduced solid with a pretreatment amount of alpha-olefin monomer under polymerization conditions, and reacting the resulting product with a Lewis base complexing agent and additional titanium tetrachloride, and (b) an alkyl aluminum halide having a halogen/aluminum atomic ratio between 0.89 and 0.98 and preferably between 0.92 and 0.98.

20 Claims, No Drawings

4,400,494

OLEFIN POLYMERIZATION CATALYST

BACKGROUND OF THE INVENTION

This invention relates to olefin polymerization catalysts and more particularly to improved catalysts for the polymerization of propylene and higher alphaolefins.

Olefin polymerization catalysts based on transition metal compounds and aluminum alkyls are well known in the art. Particularly, the use of titanium trihalide compounds to produce crystalline propylene polymers has been reported widely. Among recently published catalytic systems based on titanium trihalides are U.S. Pat. Nos. 3,984,350; 4,210,738; 4,210,729; 4,210,736; and European Patent Application No. 79301996.9 published as Number 0 011 914 based on U.S. Ser. No. 945,929 filed Sept. 26, 1978, now U.S. Pat. No. 4,295,991; all of these references are incorporated herein by reference.

U.S. Pat. No. 4,210,738 describes a titanium halide-based catalyst in the delta crystalline form and having a color tending toward violet made by reducing titanium tetrachloride with an aluminum alkyl, treating the reduced solid with an ether, thioether or thiol complexing agent and reacting with additional titanium tetrachloride.

U.S. Pat. No. 4,210,729 describes a method to preactivate the catalyst described in U.S. Pat. No. 4,210,738 with a metal organic compound of Groups Ia, IIa, IIb, or IIIa.

U.S. Pat. No. 4,210,736 describes catalysts such as those listed in U.S. Pat. No. 4,210,738 which have been dried.

U.S. Pat. No. 3,984,350 describes a highly catalytically active titanium trihalide composition in the beta crystalline form having a brown color formed by reducing titanium tetrachloride with an aluminum alkyl and reacting, under controlled conditions, the resulting reduced product with a complexing agent and additional titanium tetrachloride.

European Patent Application Publication 0 011 914 describes a method to treat a catalyst such as described in the above-cited U.S. Patents with olefin monomer such that the resulting catalyst particle is non-friable. The method disclosed in the European Patent Application comprises contacting a reduced titanium trihalide composition with olefin monomer, such as propylene, before reacting with a Lewis base complexing agent and either titanium tetrachloride or a chlorinated hydrocarbon.

U.S. patent application Ser. No. 196,012 filed Oct. 10, 1980 now U.S. Pat. No. 4,324,693, assigned to a common assignee and incorporated by reference herein, discloses an improved olefin polymerization catalyst prepared by reducing titanium tetrachloride with an aluminum alkyl, contacting the resulting reduced solid with a pretreatment amount of alpha-olefin monomer under polymerization conditions and reacting the resulting product with a Lewis base complexing agent in a molar ratio to the reduced titanium compound of greater than 1.15 to 1 and additional titanium tetrachloride. In addition, a mixed Lewis base complexing agent comprising isoamyl ether and n-butyl ether was found advantageous.

Recently, olefin polymerization in the gas-phase has been reported. Such gas-phase polymerization is advantageous in that no liquid diluent is needed in the polymerization process. However, catalyst systems designed for other polymerization processes do not always work satisfactorily in gas-phase polymerization.

Catalysts prepared according to the above-cited references generally are active propylene polymerization catalysts. However, there is a need to increase the activity of such catalysts, while maintaining their ability to produce highly crystalline polymer, for use in advanced polymerization processes such as the gas-phase olefin polymerization process. The invention disclosed herein produces a significantly greater alpha-olefin polymerization catalyst activity together with polymer containing low hexane extractables in gas-phase polymerization.

SUMMARY OF THE INVENTION

A propylene polymerization catalyst comprises (a) a product formed by reducing titanium tetrachloride with an aluminum alkyl, optionally contacting the resulting reduced solid with a pretreatment amount of alpha-olefin monomer under polymerization conditions, and reacting the resulting product with a Lewis base complexing agent and additional titanium tetrachloride and (b) an aluminum alkyl halide having a halogen/aluminum atomic ratio between 0.89 and 0.98, and preferably between 0.92 and 0.98.

BRIEF DESCRIPTION OF THE INVENTION

The olefin polymerization catalyst system of this invention comprises a reduced titanium-containing component and an alkyl aluminum halide in which the halogen/aluminum ratio is between 0.92 and 0.98. The catalyst system disclosed herein especially is advantageous in gas-phase propylene polymerization processes. In fact, use of a titanium-containing catalyst component as described herein with an alkyl aluminum halide having a halogen/aluminum ratio below 0.98–0.99 has been found not to yield good results in bulk and slurry propylene polymerizations. Thus, it is surprising that use of an alkyl aluminum halide having a halogen/aluminum ratio below 0.99 gives superior results in gas-phase polymerization.

An advantage of this invention is the observation that solutions of alkyl aluminum chloride in an alkane solvent do not form precipitates when sulfide modifiers are added. Specifically, it was found that if one mole percent hydrogen sulfide was added to an ethyl aluminum chloride solution in hexane having a chlorine/aluminum ratio of 0.89–0.98 no precipitate was formed while precipitate did form in 1 to 20 hours if the chlorine/aluminum ratio was 0.99–1.02. Mixtures containing precipitates should be avoided because of plugging of catalyst feed lines.

Another advantage of this invention is maintenance of high activity with low extractables using lower levels of catalyst modifiers. Also, hydrogen concentration for molecular weight control can be decreased which results in higher, more efficient, partial pressure of propylene.

The first step in preparing the titanium-containing catalyst component of this invention is reducing titanium tetrahalide, preferably titanium tetrachloride and typically dissolved in an inert hydrocarbon diluent, with an organoaluminum compound at a temperature of about −50° C. to about 30° C., preferably about −30° C. to about 0° C. The resulting slurry may be heated to about 50°–100° C. for a period of up to a few hours.

Organoaluminum compounds useful as reducing agents include alkyl aluminum compounds with a general formula $R_nAlX_{3-n}$ where R is an alkyl group having 1 to about 10 carbon atoms, X is a halogen, preferably chloride, n is greater than 0 and less than or equal to 3. Examples of suitable alkyl aluminum compounds are trialkyl aluminum, dialkyl aluminum halide, alkyl aluminum dihalides, alkyl aluminum sesquihalides and mixtures thereof. Preferable reducing compounds are diethyl aluminum chloride and ethyl aluminum sesquichloride.

Diluents useful in the titanium tetrachloride reduction include organic liquids substantially inert under the conditions used and include alkanes such as pentane, hexane, cyclohexane and the like.

Typically, the organoaluminum reducing agent in a hydrocarbon diluent is added, usually dropwise, to a cold solution of titanium tetrachloride in a suitable diluent with agitation. The resulting slurry preferably is heated to about 50°–100° C. for a few hours. The molar amount of organoaluminum compound to titanium tetrachloride can vary from about 0.5 to 1 to over 2 to 1 and preferably about 0.75 to 1 to about 1.5 to 1.

Adequate agitation is necessary to form catalyst particles with the desired particle size distribution. Proper agitation can depend on speed of an impeller, reactor configuration and point of addition of reactants.

The resulting solid contains titanium trichloride in the beta crystalline form according to the generally adopted classification (Journal of Polymer Chemistry, 51, 1961, pp. 399–410). Such titanium trichloride-organoaluminum complex preferably can be contacted with a polymerizable alpha-olefin under polymerization conditions either with or without separating and washing the solid material. If separated suitable amounts of alkyl aluminum cocatalyst may be added during this prepolymerization procedure.

Alpha-olefins useful in the prepolymerization (pretreatment) procedure can contain from 3 to about 22 carbon atoms, preferably 3 to about 8 carbon atoms, and most preferably is propylene. Other suitable alpha-olefins include butene-1, pentene-1, hexene-1, heptene-1, 4-methyl-pentene-1. Typically suitable alpha-olefins contain no branching on the vinylic carbon atom.

The temperature for the prepolymerization procedure can range from about 0° C. to about 100° C. and preferably is about 35° C. to about 65° C.

The pretreatment amount of polymerized alpha-olefin contained on the titanium trihalide compound can range from about 1 to about 1000 wt.%, preferably about 3 to about 100 wt.% and most preferably about 6 to about 30 wt.% based on the weight of titanium trihalide complex.

Typically, after the prepolymerization procedure is completed, the resulting product is separated and washed with a hydrocarbon solvent. The prepolymerized titanium halide complex is considered encapsulated with a coating of polymer.

The reduced titanium product, whether prepolymerized or not, typically in a hydrocarbon diluent, is treated with a Lewis base, i.e., an electron pair donor compound, such as an ether, thioether, thiol or ketone, or mixtures thereof. Examples of suitable Lewis base complexing agents are lower (2 to 8 carbon atoms) alkyl ethers such as n-butyl, isobutyl, cyclohexyl, isoamyl, octyldiphenyl, isobutylisoamyl, and isopentylphenol ethers. Preferable ether complexing agents are isoamyl and n-butyl ethers. Most preferred is a combination of n-butyl and isoamyl ethers in a molar ratio of about 1:3 to about 3:1, preferably about 1:2.

Generally, the Lewis base complexing agent is added to a hydrocarbon slurry of prepolymerized titanium halide product at ambient temperature to about 100° C. Subsequent to or in conjunction with treatment with Lewis base, the prepolymerized product is reacted further with a Lewis acid (electron pair acceptor) compound such as titanium tetrachloride. Other Lewis acid compounds include Groups IVb, IVa, and Va halides and oxyhalides. The molar ratio of Lewis acid to prepolymerized titanium halide can range from about 10:1 to 0.5:1 and preferably from about 3:1 to about 1:1.

Advantageously, after the reduced catalyst component is reacted with a Lewis acid, such as titanium trichloride, the component then is treated further with additional Lewis base such as an ether or mixed ethers. The molar ratio of additional Lewis base to reduced titanium compound can range from about 1:1 to about 1:20 and typically is about 1:2 to about 1:5.

An important consideration in preparing superior titanium-containing catalyst component is control of the morphology of the catalyst particles. It has been found that catalysts of this invention should have a substantially spherical shape and have average particle sizes between about 20 and about 45 microns. By "average particle size" it is meant that 90% of all particles have diameters within 15% of such average size. This average is determined from photomicrographs of catalyst particles using well-established statistical techniques. A preferable catalyst has an average particle size between about 25 and about 40 microns and most preferably between about 30 and 35 microns. A good morphology of catalyst particles is necessary for a good morphology of resulting polymer particles. Thus very small particles (fines) and agglomerated particles should be avoided. Generally, particle size can be controlled by the extent of agitation used; increased agitation produces smaller particles.

As described in U.S. Pat. Nos. 3,984,350 and 4,210,738 the crystalline structure of the final product can be either the delta or an active beta form. To form the active beta form the temperature in the activation step is maintained preferably at about 40° C. to about 70° C. for a limited time while the concentration of the Lewis acid compound in a hydrocarbon diluent is about 10 to about 30 wt.%. Use of Lewis acid solutions above about 30 wt.% generally produce a titanium trihalide product in the delta crystalline form.

In place of a Lewis acid reactant, chlorinated hydrocarbon compounds can be used such as hexachloroethane, pentachloroethane, trichloropentane and the like. Typically such chlorinated hydrocarbons contain 1 to about 8 carbon atoms and 2 to about 6 chlorine atoms per molecule.

The molar ratio of Lewis base complexing agent to titanium compound in the titanium-containing catalyst component of this invention can range from about 0.1 to about 2.5, preferably about 1.0 to about 1.5 and most preferably about 1.25 to about 1.35.

The chemically activated, optionally pretreated, titanium halide catalyst component described in this invention is used in conjunction with an organoaluminum chloride compound as a catalyst system to polymerize alpha-olefins, such as propylene, butene-1, and 4-methyl-pentene-1. This catalyst system is most useful to polymerize propylene or a mixture of propylene and a minor amount of ethylene or other copolymerizable alpha-olefins to a polymer containing a substantial crystalline content.

The essence of this invention is using the above-described titanium-containing catalyst component in combination with an alkyl aluminum halide in which the aluminum/halogen atomic ratio is between 0.89 and 0.98, preferably between 0.92 and 0.98 and most preferably between 0.94 and 0.97. It has been found that by using such catalyst system olefin polymerization activity is increased significantly especially in gas-phase polymerization without significant increase in formation of amorphous polymer as measured by extraction with hot hexane. Alkyl aluminum halides containing an aluminum/halogen atomic ratio of 0.89 to 0.98 can be formed by mixing suitable quantities of dialkyl aluminum halide and trialkyl aluminum. Useful halides include bromides and chlorides and useful alkyl radicals contain from two to about six carbon atoms. The preferable halide is chloride and the preferable alkyl radical is ethyl.

The molar ratio of chemically activated pretreated titanium halide to organoaluminum compound in a catalyst system can range from about one-tenth to about 10, typically is about 1 to 6. The amount of catalyst in a polymerization depends on the reactor size and type and on the amount and type of olefin monomer and is known to the skilled artisan.

Catalyst additives such as disclosed in U.S. Pat. Nos. 3,950,268 and 4,072,809, incorporated herein by reference, can be added in minor amounts. Examples of catalyst modifiers include alkyl silicates, orthosilicate esters, esters, Lewis bases such as sulfides, phosphines, phosphites, phosphates, phosphine oxides, aromatic amines, amine oxides, tertiary aliphatic amines and ethers or an organometallic chalcogenide such as bis(-trialkyl)tin sulfide. These additional additives can be present in minor amounts ranging from about one-tenth to 30 mol percent and preferably about 1 to 20 mol percent of the transition metal halide in the catalyst system.

Since the catalyst systems used in this invention are sensitive to oxygen and moisture, suitable precautions should be taken during catalyst preparation, transfer and use.

The catalyst system described in this invention can be used to polymerize alpha-olefins dissolved or suspended in liquid paraffinic medium, dissolved in liquid monomer, or in the gas phase, although this catalyst system is most beneficial in gas-phase polymerization.

Polymerization processes employing this invention can be practiced at pressures ranging from about atmospheric to about 20,000 psig and preferably from about 30 to 1000 psig.

Polymerization time depends on the process used. In batch processes the polymerization contact time usually is about one-half to several hours and in autoclave processes typically is one to four hours. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The polymerization temperature depends upon the specific catalyst system used and can range from below about 0° C. to about 120° C. However, at temperatures below about 0° C. the polymerization rate slows and reactor residence times become unreasonably long, while at temperatures above about 120° C. the polymerization rate is too high which results in excessive amounts of n-hexane soluble or extractable products. Preferably, the temperature ranges from about 2° C. to about 95° C. and most preferably from about 50° C. to about 80° C.

Gas-phase reactor systems include both stirred bed reactors and fluidized bed reactor systems. Examples of such reactor systems are described in U.S. Pat. Nos. 3,957,448; 3,965,083; 3,971,768; 3,970,611; 4,129,701; 4,101,289; 3,652,527; and 4,003,712 all incorporated by reference herein. Typical gas-phase olefin polymerization reactor systems comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid, examples of which are lower alkanes or liquid monomer such as propylene, can be added to polymerizing olefin in order to control temperature.

This invention is useful in polymerizing propylene to a normally solid, substantially crystalline polymer, although propylene also can be polymerized with minor amounts up to about 30 wt.% of ethylene or other co-polymerizable alpha-olefins containing up to 10 carbon atoms to form random, pure-block, terminal block and multisegment copolymers.

The normally-solid propylene polymers prepared according to this invention have molecular weights ranging from about 50,000 to 5,000,000 and typically range from about 200,000 to 2,000,000. The molecular weights of such propylene polymers can be controlled by methods known to the art, such as by polymerizing in the presence of hydrogen in an amount determined by melt flow rate or by the molecular weight distribution desired.

The invention is demonstrated but not limited by the following examples.

EXAMPLES I-VI

A titanium-containing catalyst component was prepared by reducing 105 grams (0.5535 mole) of titanium tetrachloride in 168 grams of n-hexane cooled to −7° C. in a vigorously stirred one-liter nitrogen-purged autoclave reactor with 71 grams (0.5879 mole) of diethyl aluminum chloride in 213 grams of n-hexane added dropwise over four hours. The temperature was maintained at −7° C. for an additional 15 minutes, raised to 65° C. within one hour, maintained at 65° C. for two hours. After cooling slightly, the reactor was vented to 1 psig, 24 grams of propylene were admitted slowly. After about 45 minutes, the reactor was vented and flushed several times with nitrogen. The resulting solid product was washed seven times with 225-milliliter portions of n-hexane. The average particle size of such product was 22.5±3 microns. The supernatant liquid from the last wash was decanted and 400 grams of n-hexane were added to the reactor. A mixture of 31.2 grams (0.240 mole) of di-n-butyl ether and 75.9 grams (0.480 mole) of diisoamyl ether was added to the moderately agitated reactor at a temperature of 35° C. Agitation continued for 90 minutes after which the suspension was allowed to settle for 15 minutes. The ethers (Lewis base) to titanium molar ratio was 1.30:1.

Supernatant liquid was decanted and 110 grams (0.580 mole) of titanium tetrachloride in 56 grams of n-hexane were added with moderate agitation which was decreased after 15 minutes. The temperature was maintained at 70° C. for 90 minutes. After the color of the resulting solid suspension turned from brown-like to purple, 30 milliliters of a di-n-butyl ether and diisoamyl ether mixture (molar ratio 1:2) was added. The temperature was maintained at 70° C. for an additional 30 minutes and then cooled to 50° C. After solids were allowed to settle, supernatant liquid was decanted and the purple solid was washed 10 times with 224-milliliter portions of n-hexane. The average particle size of the resulting particles was 28.5±4.2 microns.

A series of polymerization tests were performed using gas-phase polymerization techniques. A gas-phase polymerization apparatus was used similar to that described in U.S. Pat. No. 4,129,701. The polymerization reactor was a four-inch inside diameter pipe sealed at the ends equipped with a longitudinal agitation shaft having flat agitator blades which sweep a twelve-inch polymer powder bed. There was a disk with a U-shaped cutout at the end of the polymer bed which acts as a wier over which polymer is removed. Polymer was removed from the reactor through a hole at the end of the reactor behind the wier. Propylene monomer was injected into the reactor through three equally spaced ports above the polymer bed. Cooling coils and heating tape were wrapped around the reactor for temperature control. The reactor was operated by injecting, under a nitrogen purge and polymer bed stirring, through separate syringes a slurry of titanium-containing component in hexane and a slurry in hexane of the organoaluminum chloride together with catalyst modifiers. After the organoaluminum was added, the reactor was vented, hydrogen was added and the reactor pressurized to 300 psig with propylene. During polymerization water and air were passed through the cooling coils to remove heat of polymerization. Polymerization was run at 71° C. for 2.5 hours with 6 psig hydrogen partial pressure and a 300 psig total pressure. Catalyst modifiers used were hydrogen sulfide and collidine. Results from the series of polymerizations are shown in Table I. The organoaluminum chloride was diethyl aluminum chloride or a mixture of diethyl aluminum chloride and triethyl aluminum.

the superior results of Example I are obtained at 60 percent reduced modifier level.

Comparative slurry polymerizations were run using organoaluminum chlorides having various chlorine/aluminum ratios. Propylene was polymerized in a two-liter stirred Parr autoclave at 65° C. at 168 psig for three hours in 750 milliliters of dry, oxygen-free hexane. After the hexane was added to the reactor a solution containing 300 milligrams of organoaluminum chloride in hexane was added under nitrogen flow followed by a hexane slurry of titanium-containing component as prepared in Example I. Hydrogen and then propylene were added with stirring to a heated autoclave. After polymerization polymer powder was removed and washed with hexane. Aliquots of combined filtrates were dried to determine the percent of hexane solubles. The polymer powder was extracted with hot hexane to determine the percent of extractables. The organoaluminum chloride used was diethyl aluminum chloride or a mixture of diethyl aluminum chloride and triethyl aluminum. Results of these polymerization runs are shown in Table II. The data show that using organoaluminum chloride with decreased chlorine/aluminum ratio somewhat increase yield but also substantially increase atactic polymer production as measured by hexane solubles and extractables.

TABLE II

|  | F | G | H | J | K | L |
|---|---|---|---|---|---|---|
| Organoaluminum chloride (mole ratio to TiCl$_3$) | 12.8 | 13.06 | 13.18 | 13.3 | 13.44 | 13.44 |
| Chlorine/Aluminum (atomic ratio) | 1.02 | 1.00 | 0.99 | 0.98 | 0.97 | 0.97 |
| Yield (gram of polymer/ grams of TiCl$_3$)[1] | 6263 | 7654 | 7667 | 8065 | 5345 | 6526 |
| Solubles & Extractables (wt. %) | 2.1 | 3.1 | 3.2 | 3.5 | 17.3 | 15.2 |
| Bulk Density (lbs./ft.$^3$) | 31.6 | 32.2 | 30.4 | 31.5 | 24.9 | 27.3 |

[1] Determined from metal analysis by x-ray fluorescence.

What is claimed is:

1. A process for polymerization of propylene or a mixture of propylene and a minor amount of copolymerizable alpha-olefin comprising contacting in the vapor phase propylene or a mixture of propylene and a copolymerizable alpha-olefin with a catalyst comprising:

A. a solid titanium-containing component formed by

TABLE I

| Components (mole ratio to TiCl$_3$) | A | B | C | D | Ex. I | Ex II | Ex III | Ex IV | Ex V | Ex VI |
|---|---|---|---|---|---|---|---|---|---|---|
| Organoaluminum chloride | 2.7 | 3.5 | 2.9 | 3.8 | 3.9 | 2.6 | 2.6 | 2.5 | 3.2 | 2.9 |
| Hydrogen sulfide | 0.03 | 0.01 | 0.02 | 0.012 | 0.013 | 0.025 | 0.024 | 0.024 | 0.08 | 0.026 |
| Collidine | 0.03 | 0.01 | 0.02 | 0.012 | 0.013 | 0.025 | 0.025 | 0.025 | 0.08 | 0.026 |
| Chlorine/Aluminum (atomic ratio) | 1.02 | 1.02 | 1.00 | 0.99 | 0.97 | 0.97 | 0.95 | 0.92 | 0.92 | 0.89 |
| Yield (grams of polymer/ grams of TiCl$_3$)[1] | 8200 | 9000 | 9300 | 8860 | 10,330 | 10,200 | 10,200 | 11,500 | 10,300 | 10,300 |
| Extractables (wt. %) | 4.0 | 2.6 | 2.8 | 2.3 | 1.7 | 2.6 | 4.5 | 5.2 | 4.5 | 6.1 |
| Bulk Density (lbs./ft.$^3$) | 25.6 | 25.0 | 26.2 | 25.0 | 25.6 | 25.6 | 26.2 | 26.8 | 27.5 | 26.2 |

[1] Determined from metal analysis by x-ray fluorescence.

The data contained in Table I show gas-phase polymerization using an organoaluminum chloride having a chlorine/aluminum ratio below 0.98 exhibits higher activity and substantially equivalent extractables than comparable runs using organo-aluminum chlorides having higher chlorine/aluminum ratios. Also shown is that steps comprising (1) reducing titanium tetrachloride with an aluminum alkyl and (2) reacting the resulting solid with a Lewis base complexing agent and a Lewis acid; and B. an ethyl aluminum halide having a halogen/aluminum atomic ratio between 0.89 and 0.98.

2. The process of claim 1 wherein the product formed by reduction of titanium tetrachloride with aluminum alkyl is contacted with a pretreatment amount of an alpha-olefin monomer under polymerization conditions.

3. The process of claim 1, wherein the Lewis base complexing agent is an ether, a thioether or a thiol.

4. The process of claim 1, wherein the Lewis base complexing agent is a lower alkyl ether.

5. The process of claim 1 wherein the Lewis base complexing agent is di-n-butyl ether, diisoamyl ether or a mixture thereof.

6. The process of claim 1 wherein the Lewis acid is additional titanium tetrachloride.

7. The process of claim 6 wherein the Lewis base complexing agent is a mixture of di-n-butyl ether and diisoamyl ether.

8. The process of claim 1 wherein the molar ratio of Lewis base to titanium compound is between about 1.15 to 1 and about 1.5 to 1.

9. The process of claim 7 wherein the molar ratio of Lewis base to titanium compound is between about 1.25 to 1 and about 1.35 to 1.

10. The process of claim 1 wherein propylene is polymerized.

11. The process of claim 2 wherein the pretreatment alpha-olefin monomer is propylene.

12. The process of claim 2 wherein the molar ratio of Lewis base to titanium compound is between about 1.15 to 1 and about 1.5 to 1.

13. The process of claim 7 wherein the reduced titanium compound is pretreated with propylene monomer.

14. The process of claim 13 wherein the molar ratio Lewis base to titanium compound is between about 1.25 to 1 and about 1.35 to 1.

15. The process of claim 1 wherein the halogen/aluminum atomic ratio is between 0.92 and 0.98.

16. The process of claim 1 wherein the halogen/aluminum atomic ratio is between 0.92 and 0.98.

17. The process of claim 1 wherein the halogen/aluminum atomic ratio is between 0.94 and 0.97.

18. The process of claim 1 or 2 wherein additional Lewis base is added after initial reaction of the reduced titanium compound with a Lewis base and a Lewis acid.

19. The process of claim 11 wherein (a) the pretreated, reduced titanium-containing compound first is reacted with a mixture of di-n-butyl ether and diisoamyl ether such that the molar ratio of ethers to titanium compound is between 1.15 to 1 and about 1.5 to 1, secondly the resulting mixture is reacted with titanium tetrachloride and thirdly the resulting mixture is reacted with additional quantities of a mixture of di-n-butyl ether and diisoamyl ether, and (b) the alkyl aluminum halide has a halogen/aluminum atomic ratio between 0.94 and 0.97.

20. The process of claim 1, 2, 11 or 19 wherein the ethyl aluminum halide is ethyl aluminum chloride.

* * * * *